Figure 1:
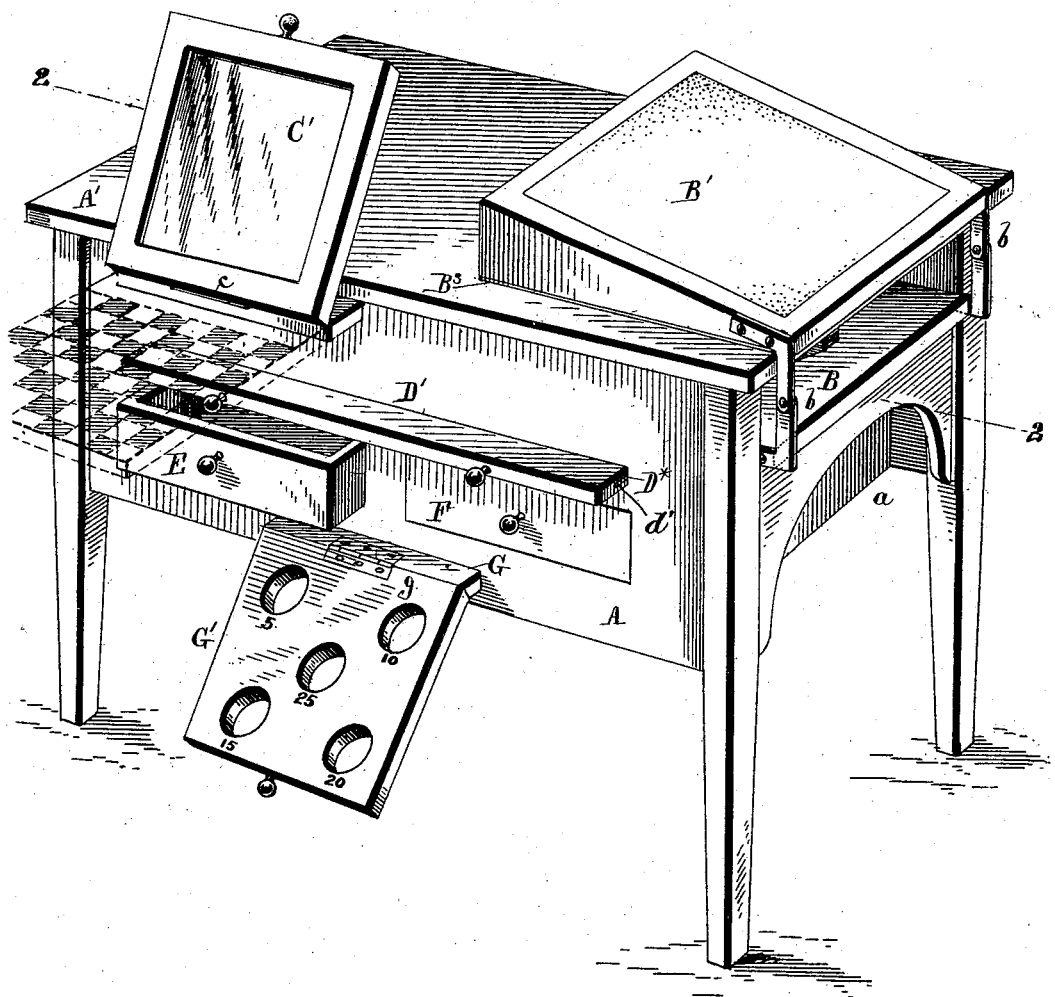

(No Model.)　　　　　　　　　　　　　　　　　2 Sheets—Sheet 1.
G. C. SMITH.
CABINET.

No. 591,574.　　　　　　　　　　Patented Oct. 12, 1897.

Witnesses:
L. C. Hills.
M. F. Boyle.

Inventor:
George C. Smith
By Thomas Drew Stetson
Atty.

(No Model.) 2 Sheets—Sheet 2.
G. C. SMITH.
CABINET.
No. 591,574. Patented Oct. 12, 1897.
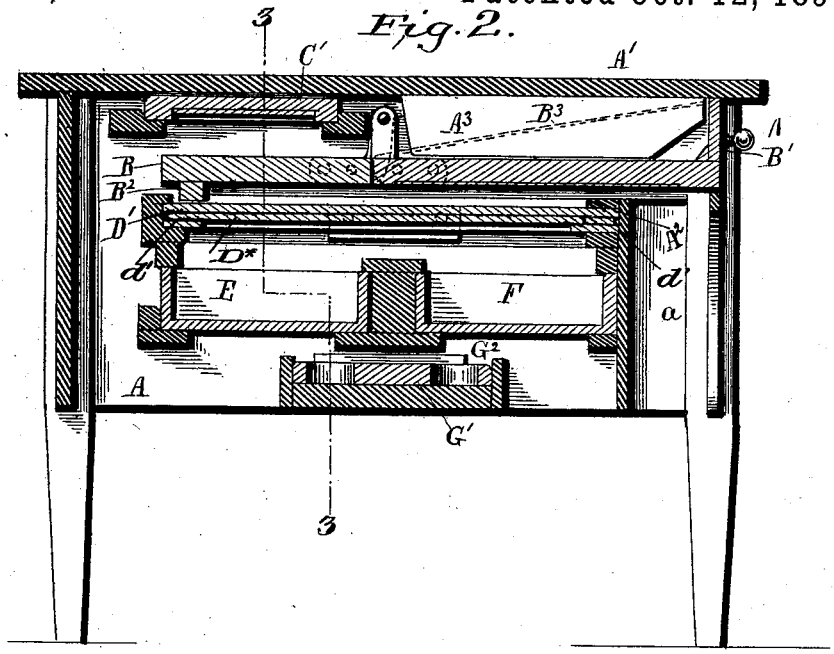
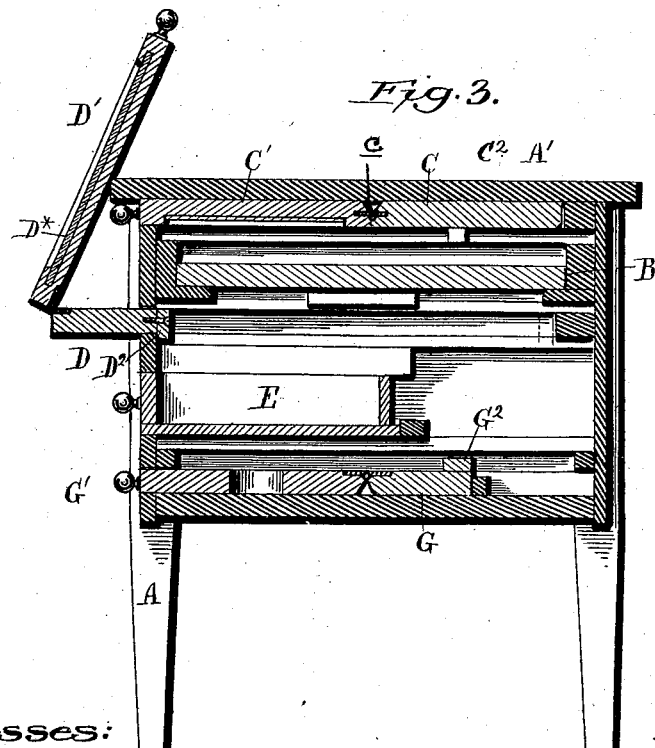
Witnesses:
L. C. Hills.
M. F. Boyle.
Inventor:
George C. Smith
By Thomas Drew Stetson
Atty.

UNITED STATES PATENT OFFICE.

GEORGE C. SMITH, OF NEW YORK, N. Y.

CABINET.

SPECIFICATION forming part of Letters Patent No. 591,574, dated October 12, 1897.

Application filed May 28, 1895. Renewed September 1, 1897. Serial No. 650,295. (No model.)

*To all whom it may concern:*

Be it known that I, GEORGE C. SMITH, a citizen of the United States, residing in the city and county of New York, in the State of New York, have invented a certain new and useful Improvement in Cabinets for House and Office Furnishing; and I do hereby declare that the following is a full and exact description thereof.

The improved cabinet is of that class which serves a number of different uses by changing the position of certain parts. It may be made in various sizes and with various degrees of elaboration and richness of material. I will describe it as made of good hard wood, with ordinary fastenings and hinges of brass or iron. It can serve as a table, presenting a large rectangular upper surface in a single piece. Immediately under the top is a hinged slide drawing out from the end and adapted to fold over upon the table and present a liberal inclined surface to serve as a desk. Ink or other defacing marks made on this desk, as are liable to occur in use, will not affect the top of the table, which may remain an elegant surface adapted for drawing-room or other elegant uses for long periods. A space above this slide, near the opposite end, accommodates a transverse slide, which may be used either in the horizontal position, as a chess-board, or may be turned up and slightly inclined inward against the edge of the table to serve as a mirror, one face of the slide being finished checkerwise and the other face being provided with a silvered glass. Lower, and drawing out laterally like the chess-board and mirror, and therefore transversely to the motion of the main desk-slide, is a large hinged slide, which may be only partially drawn out and serve as a shelf for miscellaneous purposes. The upper face of this shelf may be equipped to serve for any refined game requiring an extended and properly-prepared surface, as what is sometimes known as the "race-course," or it may be drawn out farther and turned upward, exhibiting what was the under face in position to serve as a slate or blackboard, the under face of this shelf having a proper surface to serve for these uses. I provide for an increase of friction at the point where this slide should be allowed to stop to serve as a shelf; but the friction is not so great as to require any manipulation except a sufficiently strong pull to draw it quite out and allow it to be turned up for the other use. Below this are drawers which perform their usual functions, and still lower again are slides, one or more, equipped to serve for parlor-games. I have shown only one such bottom slide having cavities or complete apertures adapted for games.

The accompanying drawings form a part of this specification and represent what I consider the best means of carrying out the invention.

Figure 1 is a perspective view showing the main slide drawn out and adjusted for use as a desk and the other parts more or less drawn out, the highest slide shown in strong lines adjusted to serve as a mirror and in dotted lines to serve as a chess-board. Fig. 2 is a longitudinal vertical section on the center line, all the slides being thrust in and the cabinet adapted to serve as an ordinary table. Fig. 3 is a transverse section on the line 3 3 in Fig. 2, the third "slate" slide being drawn out and turned up for use.

Similar letters of reference indicate corresponding parts in all the figures where they appear.

A is the main body of the cabinet, the top A' being finished in any preferred manner, as with a single slab of marble or a single or compound piece of well-seasoned wood either bare or covered with plush or other surfacing material. The interior of the cabinet A is properly finished to receive and guide the several slides. One end is recessed, as indicated by $a$, to receive the knees of a person sitting at that end.

B B' is the main slide, in two parts joined by angular hinges $b$, which hold the pivots by which the parts are hinged together at a high level, so that on drawing out the slide and lifting the part B' and turning it back until it rests upon the table it will rest fairly and present a proper gently-inclined surface to serve as a disk. The back end of the part B carries a cross-cleat $B^2$ on its under face, which strikes a stop $A^2$ when the slide has been drawn out to the proper extent. A central web $A^3$, fixed above, presses gently on the upper surface of this slide. The friction induced by the presence of this guiding-web is usually gentle, but if through imperfect workmanship or any cause its friction becomes great its central position becomes important. It has little tendency to induce "binding"—a skewed position of the slide in being moved inward and outward. The portion B' is wedge-formed at each side and bears on the table at the sides supporting the plane upper surface in the properly-inclined position to serve as a desk, the construction not only avoiding the risk of soiling the upper surface of the table, but also avoiding any pressure on the central and main portion which might mar its appearance. All the other slides move transversely to this.

C C' is a hinged slide in two parts joined by hinges $c$. This is arranged close under the top A' at the end opposite to that which serves as a desk. The upper face of the part C' is equipped to serve as a chess-board, the lower face to serve as a mirror. The upper face serves when the slide is partially or completely drawn out, with the part C' remaining in a horizontal position. The other face is useful only when the part C' is turned up. The edge of the table A' serves as a stop to support the part C' when drawn out and turned up to serve as a mirror.

D D' is a larger slide in two parts, connected by hinges $d$. The upper face of the part D' may be left plain to serve as an ordinary shelf, but I prefer to finish it for some game. The opposite face of this part of my cabinet may present pictures, lettering, or other marks for instruction or amusement, or both. The edge of the table serves to support the part D' when adjusted for use as a slate or blackboard.

The slide C C' is provided with a transverse cleat $C^2$ on the under face of the part C, which abuts against a fixed stop when the slide has been drawn out to the proper extent. The hinged slide D D' is correspondingly fitted with a transverse cleat $D^2$ in the proper position on the under face of the part D, which meets a fixed stop and prevents this slide from being drawn out too far. It will be observed that the parts C' and D' serve usefully in two positions—horizontal and upright.

E and F are drawers which may serve to hold portions of the apparatus for the several games, writing materials, &c.

G G' is a hinged slide at a still lower level. The parts are joined by one or more hinges $g$. One or both of the abutting surfaces adjacent to the hinge are beveled and adapted to support the exposed portion firmly in an inclined position. When the slide is drawn out, the part G' may be depressed to about thirty degrees. This part is equipped to serve for games requiring a board to be held in such inclined position. The abutting of the edges holds the hinged portion with sufficient firmness. The elasticity due to this mode of supporting is of advantage in receiving the shocks of projectiles in the several games. This lowest slide G G' is provided with a cross-cleat $G^2$ on the upper side of the part G, which strikes a fixed stop and arrests the movement when this slide has been drawn out to the proper extent. All the slides have stops to prevent them from being thrust in too far. It is important to be able to determine easily the right position in which to leave each of the slides in drawing them partially out. This is attained by giving an increased thickness at the hinge and causing a correspondingly-increased resistance by friction when the slides are drawn out to the extent that the hinge enters the contracted portion of its path—the front of the casing A. Each slide moves easily in the first part of its motion in being drawn out. Then as the movement advances the operator feels an increased resistance due to the friction of the hinge in entering the front wall of the casing. If it is desired to use the slide in the horizontal position, this increased friction gives the hint on which the operator arrests the movement, and the slide is found to be properly placed for use in the horizontal position. If, on the contrary, it is desired to turn up the slide and use it in the vertical position, it is necessary simply to increase the force with which the slide is drawn out. It is not necessary to liberate any fastening or take any step except to pull with sufficient force, and the slide in obedience to the increased force moves farther outward. As soon as the hinge has completely traversed through the wall and has emerged from the front of the casing the slide moves freely again, and the motion to complete the forward movement to its extreme limit is easy.

The portion D is compound, being composed of a marginal frame of hard wood or other suitable material and a panel D*. It is practicable to inclose a single panel permanently in the frame, but in what I esteem a preferable construction one side of the frame D' is provided with a long narrow aperture or slot $d'$ of sufficient length and breadth to allow the panel to be thrust in and drawn out from the slot $d'$. I provide a number of panels, which may be added to from time to time, substituting one for another, as occasion may require. I propose to use for this purpose thin wood or pasteboard saturated to stand water for washing and properly surfaced to constitute what is sometimes known as "silicate slate." The several panels of blackboard or imitation slate are carved or printed with the lines required for different games, or with skeleton outlines of maps of countries or drawings of machinery or sections of objects in botany and natural history, &c., leaving the student or player to fill in the remaining portions. A new panel is substituted when the study or play requires a different set of skeleton lines.

The construction involves the advantage, among others, that when the desk is in use there will be liberty for the knees of the user to be received under the end of the table.

I further guard against risk of marring the top surface A' of my cabinet by facing the lower edges of the wedge-formed bearing-pieces of the part B' with soft leather, rubber, felt, or analogous yielding material B³. (Indicated in strong lines in Fig. 1 and in dotted lines in Fig. 2.)

All the hinges which connect the two parts of a slide are arranged with their axes near or above the upper face. This allows the whole thickness of the slide to serve as a bearing to maintain the hinged part in or near the horizontal position. In all the slides except the lowest G G' these abutting surfaces are at right angles to the plane of the slide, but in this slide the surfaces of one or both are sufficiently beveled to allow the hinged part G' to drop about thirty degrees.

While the details of construction shown in the drawings are the ones I prefer, they are subject to modifications which would not depart from the spirit of the invention and are intended to be included by the claims.

Parts of the invention can be used without the whole. I can dispense with the provisions for increased friction at certain stages and depend on the eye and judgment of the operator to determine without such assistance the correct position for using the slides horizontally.

Instead of the knobs shown on the several slides I can use knobs or other devices sunk in the face, or I can substitute drop-handles or any other ordinary or suitable devices. I can provide a lock on one of the slides or on each of them if desired in any case.

I claim as my invention—

1. In a cabinet the frame A, having a continuous top A', and a compound slide in two parts B B', joined by angular hinges b, set on the edges respectively and having bearings at each edge which are wedge-formed adapted to support the desk-surface B' at a gentle inclination leaving the main surface of the top unmarred, all combined and arranged for joint operation substantially as herein specified.

2. In a cabinet the frame A having a continuous top A' and a compound slide in two parts B B', joined by angular hinges b, set on the edges respectively and having bearings at each edge which are wedge-formed adapted to support the desk-surface B' at a gentle inclination, in combination with each other and with the series of transverse slides C C' and D D', adapted to serve as herein specified.

3. In a cabinet a slide in two parts hinged together and having greater dimensions at the line of the hinges, arranged to serve in either of two positions at will, in combination with a frame A having a close-fitting aperture in its side through which the slide is moved, adapted to temporarily increase the friction and thus to conveniently give notice to the operator when the slide has been drawn out to the proper extent to allow of serving in one position and to again reduce the friction when this point has been passed, and allow the slide to be drawn easily outward into the second position, all substantially as herein specified.

4. In a cabinet the frame A having a continuous top A' and a compound slide in two parts B B', joined by angular hinges b set on the edges respectively and having bearings at each edge which are wedge-formed adapted to support the desk-surface B' at a gentle inclination, in combination with each other and with a series of slides each adapted to serve either in the horizontal position or to fold upward and to serve by resting against the edge of the top A', substantially as herein specified.

5. In a cabinet a slide in two parts D D' adapted to serve in either of two positions at will, connected by hinges d, the hinged part D' being a frame open on one edge and having a slot d' in one of the lateral edges, in combination with each other and with a series of exchangeable slates adapted to be inserted and removed through such slot, all substantially as herein specified.

In testimony that I claim the invention above set forth I affix my signature in presence of two witnesses.

GEO. C. SMITH.

Witnesses:
THOMAS DREW STETSON,
M. F. BOYLE.